(12) United States Patent
Kahn et al.

(10) Patent No.: US 12,332,831 B2
(45) Date of Patent: Jun. 17, 2025

(54) SYSTEMS AND METHODS FOR COMMUNICATIONS WITHIN A STORAGE CHASSIS USING IN-BAND DATA AND OUT-OF-BAND DATA

(71) Applicant: Samsung Electronics, Co., Ltd., Suwon-si (KR)

(72) Inventors: Caroline Diana Kahn, Santa Clara, CA (US); Sompong Paul Olarig, Pleasanton, CA (US); Ilker Cebeli, Portland, OR (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/226,998

(22) Filed: Apr. 9, 2021

(65) Prior Publication Data

US 2021/0397577 A1    Dec. 23, 2021

Related U.S. Application Data

(60) Provisional application No. 63/041,115, filed on Jun. 18, 2020.

(51) Int. Cl.
*G06F 13/42* (2006.01)
*G06F 1/18* (2006.01)
(Continued)

(52) U.S. Cl.
CPC ...... *G06F 13/4282* (2013.01); *G06F 13/4022* (2013.01); *H04L 67/06* (2013.01); *H04L 67/1097* (2013.01); *H04L 69/16* (2013.01)

(58) Field of Classification Search
CPC .. G06F 13/4282; G06F 13/4022; G06F 1/183; G06F 13/385; G06F 3/0604;
(Continued)

(56) References Cited

U.S. PATENT DOCUMENTS 6,425,133 B1 * 7/2002 Leary .................. H04N 7/165
   725/132
7,773,540 B1 * 8/2010 Zatko .................. H04L 65/1069
   370/254

(Continued)

FOREIGN PATENT DOCUMENTS

CN    111338676 A    6/2020

OTHER PUBLICATIONS

Malathi Veeraraghavan and Haobo Wang. "A Comparison of In-Band and Out-of-Band Transport Options for Signaling." IEEE Global Telecommunications Conference Workshops, 2004. GlobeCom Workshops 2004. DOI: 10.1109/GLOCOMW.2004.1417600 (Year: 2004).*

(Continued)

*Primary Examiner* — Farley Abad
*Assistant Examiner* — Henry W Yu
(74) *Attorney, Agent, or Firm* — Lewis Roca Rothgerber Christie LLP

(57) ABSTRACT

Provided are systems, methods, and apparatuses for performing communication management. The method can include: receiving, via a first port, in-band data from a management device; generating routing information for routing the in-band data to at least one storage device in a chassis; applying the routing information to a header of a packet of data associated with the in-band data; and transmitting, via a second port, the in-band data to the storage device based on the routing information.

23 Claims, 10 Drawing Sheets

(51) Int. Cl.
*G06F 3/06* (2006.01)
*G06F 13/38* (2006.01)
*G06F 13/40* (2006.01)
*H04L 49/351* (2022.01)
*H04L 67/06* (2022.01)
*H04L 67/1097* (2022.01)
*H04L 67/145* (2022.01)
*H04L 67/63* (2022.01)
*H04L 69/16* (2022.01)

(58) Field of Classification Search
CPC ... G06F 3/0688; G06F 13/4009; H04L 67/06; H04L 67/1097; H04L 69/16; H04L 67/63; H04L 49/351; H04L 67/145
USPC ....... 710/5, 15, 20, 27, 33, 36, 62, 305, 313
See application file for complete search history.

(56) References Cited

U.S. PATENT DOCUMENTS

| | | | | |
|---|---|---|---|---|
| 2002/0161923 | A1* | 10/2002 | Foster | H04L 67/1029 709/239 |
| 2005/0033756 | A1* | 2/2005 | Kottomtharayil | G06F 3/0619 |
| 2005/0185917 | A1* | 8/2005 | Andrzej | H04N 7/163 348/E7.063 |
| 2005/0223056 | A1* | 10/2005 | Jeffries | H04L 47/10 709/201 |
| 2006/0187914 | A1* | 8/2006 | Gumaste | H04L 61/106 370/402 |
| 2006/0259612 | A1* | 11/2006 | De Oliveira | H04L 69/18 709/224 |
| 2008/0175370 | A1* | 7/2008 | Elharrar | H04Q 3/66 379/221.14 |
| 2008/0235363 | A1* | 9/2008 | Shah | H04L 41/0273 709/223 |
| 2010/0122028 | A1* | 5/2010 | Fujibayashi | G06F 3/067 711/170 |
| 2010/0189110 | A1* | 7/2010 | Kambhampati | H04L 45/00 370/400 |
| 2013/0179872 | A1* | 7/2013 | Kuzmack | G06F 9/45533 717/173 |
| 2014/0208133 | A1 | 7/2014 | Gopal et al. | |
| 2015/0161391 | A1* | 6/2015 | Johnsen | G06F 21/572 713/2 |
| 2015/0312124 | A1* | 10/2015 | Curtin | H04L 67/1097 709/224 |
| 2017/0116103 | A1* | 4/2017 | Cencini | H04L 41/24 |
| 2017/0357610 | A1 | 12/2017 | Thompson | |
| 2019/0050351 | A1 | 2/2019 | Sahu et al. | |
| 2019/0327144 | A1 | 10/2019 | Tembey et al. | |
| 2021/0132972 | A1* | 5/2021 | Gupta | G06F 3/0688 |

OTHER PUBLICATIONS

Cheng-Chun Tu, Pai-Wei Wang, and Tzi-cker Chiueh. "In-Band Control for an Ethernet-Based Software-Defined Network." SYSTOR 2014: Proceedings of International Conference on Systems and Storage. Jun. 2014. DOI 10.1145/2611354.2611359. (Year: 2014).*

Office of Infosec Research and Technology, Secure In-Band Update of Trusted Certificates, IEEE 8th International Workshops on Enabling Technologies: Infrastructure for Collaborative Enterprises (WET ICE'99), IEEE Computer Society 1999, pp. 168-173, Los Alamitos, CA, USA. (Year: 1999).*

Taiwanese Office Action dated Aug. 22, 2024, issued in corresponding Taiwanese Patent Application No. 110117876 (8 pages).

* cited by examiner

SYSTEMS AND METHODS FOR COMMUNICATIONS WITHIN A STORAGE CHASSIS USING IN-BAND DATA AND OUT-OF-BAND DATA

CROSS-REFERENCE TO RELATED APPLICATION(S)

The present application claims priority to and the benefit of U.S. Provisional Application No. 63/041,115, filed Jun. 18, 2020, entitled "System method of supporting direct communication between in-band and out-of-band management within chassis," the entire contents of all which is incorporated herein by reference.

FIELD

The disclosure relate generally to a chassis system, and more particularly, to systems and methods for communications within a storage chassis.

BACKGROUND

The present background section is intended to provide context only, and the disclosure of any concept in this section does not constitute an admission that said concept is prior art.

With advances in technology, the size and amount of data is increasing rapidly as data is collected by devices such as mobile devices, Internet of things devices, aerial (remote sensing) devices, software logs, cameras, microphones, radio-frequency identification (RFID) readers, wireless sensor networks, and the like. To process and use information represented by the collected data, servers are often used in datacenters to filter, compute, store, and perform related operations on the data. A need remains for systems and methods that improve the communications among devices in such datacenters.

The above information disclosed in this background section is only for enhancement of understanding of the background of the disclosure and therefore, it may contain information that does not constitute prior art.

SUMMARY

In various embodiments, described herein include systems, methods, and apparatuses for communications within a storage chassis.

In particular, a system for storage is described. The system can include a chassis, the chassis including storage devices for storing data; a management processor that determines routing information for routing in-band data to a storage device of the storage devices; a management device that performs communication management, where the management device: transmits, via a first port, in-band data to the storage device based on the routing information; and transmits, via a second port, out-of-band data to the storage device.

In some embodiments, the management processor includes an Ethernet bunch of flash (EBOF) processor and the management device includes at least one of a baseboard management controller (BMC), a field-programmable array (FPGA), an application specific integrated circuit (ASIC), or a processor. In other embodiments, the system further includes a switch, and the management processor routes the in-band data from the management device to a second storage device of the storage devices via the switch. In various embodiments, the switch receives second in-band data from a host and the switch transmits the second in-band data to the storage device. In other embodiments, the host includes a non-volatile memory express over fabric (NVMe-oF) initiator and the storage device includes an NVMe-oF target.

In an embodiment, the storage device includes a third port to receive the in-band data and a fourth port to receive the out-of-band data. In some embodiments, the storage device includes an Ethernet solid state drive (SSD) and the third port includes an Ethernet port and the fourth port includes an Inter-Integrated Circuit (I2C) or System Management Bus (SMBus) port.

In various embodiments, the management device or the management processor applies a header information to at least one packet of data associated with the in-band data. In other embodiments, the header information includes a Management Component Transport Protocol (MCTP) over Transmission Control Protocol (TCP) based information and the at least one packet is transmitted to the management processor via a TCP Internet Protocol (IP) over Ethernet protocol. In an embodiment, the out-of-band data is received from a management host and the out-of-band data is transmitted to the storage device via an I2C/SMBus. In some embodiments, the in-band data includes a firmware upgrade or a security certificate. Alternatively or additionally, the in-band data can include management data including, but not limited to, configuration, status, manufacturing data and logs. Examples include port and protocol information like IP addresses, health, temperature, power readings, vital product data (VPD), model numbers, serial numbers, telemetry, statistics, security keys, and firmware measurements. In another embodiment, the disclosed systems can include Ethernet-based solid-state storage devices (SSDs) that can use Ethernet for in-band communications, and can be configured to use any suitable physical connector including, but not limited to, a SFF-8201 connector, a SFF-8223 connector, a SFF-8301 connector, a SFF-8323 connector, and a SFF-100x connector.

Similarly, devices and methods for performing substantially the same or similar operations as described above are further disclosed.

Accordingly, particular embodiments of the subject matter described herein can be implemented so as to realize one or more of the following advantages. Reduce network latencies and improve network stability and operational data transfer rates and, in turn, improve the user experience. Reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
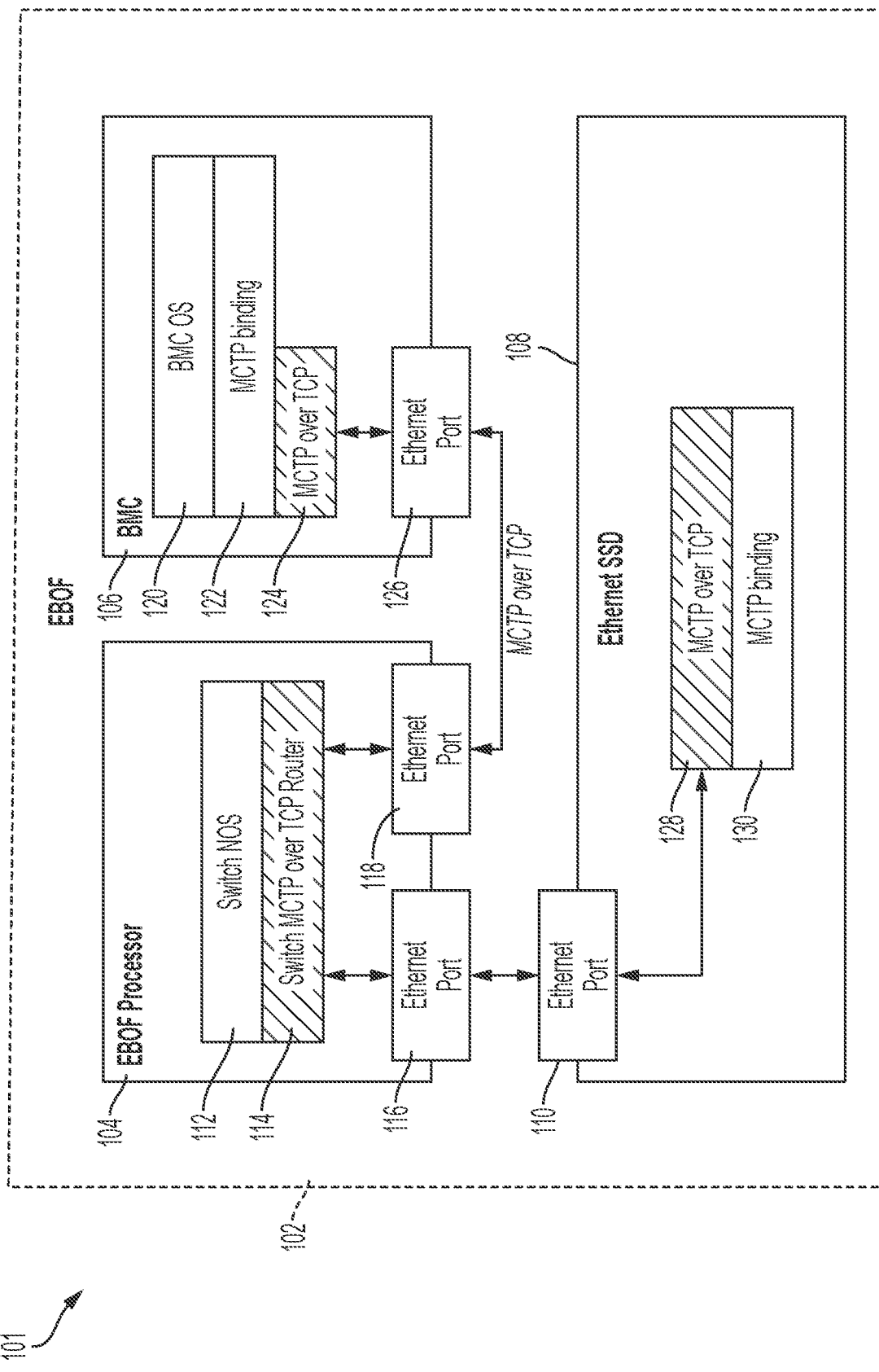
FIG. 1 is an illustration of an exemplary of a first view of the disclosed systems for in-band and out-of-band communication for devices associated with a chassis, in accordance with example embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

In various aspects, a computing platform (e.g., a server rack or chassis of a data center) can include devices (e.g., processors, management devices, switches and/or the like) that communicate to perform management functions within the platform. The communications and/or interfaces associated with a platform can be configured to operate for the specific devices of the platform. Various hardware management services can include, but not be limited to, monitoring functions for devices such as storage devices (e.g., temperature monitoring, voltage monitoring, fan speeds, hardware error status, etc.), control functions (e.g., platform power-on/off, reset, etc.), device firmware update and device functional management. In some respects, such platforms can include controllers to support access to the management monitoring and control functions, which provide monitoring and control services for access by other management controllers.

In various embodiments, the disclosed systems can be used with platforms including Ethernet bunch of flash (EBOF) devices, which represents a storage system that is used in connection with applications and workloads that benefit from disaggregated low-latency, high bandwidth, and highly available storage. In such an EBOF-based chassis used with a computing platform described above, a management device such as a baseboard management component (BMC) and/or storage devices such as network attached storage devices (e.g., Ethernet solid-state drives, SSDs) may reside on separate networks or separate portions of a network (e.g., separate Ethernet networks). Accordingly, such devices may not necessarily be able to communicate directly with each other, since the BMC and the Ethernet-based solid state storage devices can be on different Ethernet networks. In another embodiment, the management device can include a service processor or BMC that can be used to manage local SSDs (e.g., Ethernet-based solid state storage devices) located in the same chassis. In various respects, a storage device such as an Ethernet SSD (or other fabric-attached storage device such as a native non-volatile memory express over fabric (NVMe-oF) device) can include an in-band Ethernet port over which the device receives in-band information including data and management information. Further, such an example Ethernet SSD can include an out-of-band port such as an Inter-Integrated Circuit (I2C) and/or System Management Bus (SMBus) interface over which the device can receive out-of-band information for management, for example, via a management device such as the BMC. In some cases, the management device may not have access to in-band Ethernet and, as a result, may only be able to manage such Ethernet SSDs via the optional out-of-band port such as the I2C/SMBus interface.

Moreover, there may be various protocols and/or standards including, but not limited to, a Distributed Management Task Force (DMTF)'s Platform Management Components Intercommunication (PMCI) protocol stack may primarily describe various in-chassis communication standards. Such standards such as the PMCI protocol may further include a Management Component Transport Protocol (MCTP) which can enable data to travel over certain physical layers such as peripheral component interconnect express (PCIe) and I2C/SMBus, but may not be configurable to work with other protocols such as Ethernet. Further, the disclosed systems can be operable with a security protocol such as a Security Protocol and Data Model (SPDM) protocol that can be used for security and can enable data to travel over the MCTP transport layer and can be used for attestation and for secure communication between devices. Additionally, PMCI can further include a Platform Level Data Model (PLDM) protocol that can enable information to travel over the MCTP transport layer and can be used for platform management, including firmware upgrades. Further, the disclosed systems can use SPDM to provide and/or security certificates. In some respects, the disclosed systems can operate according to a networking protocol such a Simple Service Discovery Protocol (SSDP), which can be used in connection with user datagram protocol (UDP), Internet protocol (IP), and/or Ethernet. However, management devices such as the BMC may need to communicate with Ethernet SSDs in an EBOF via out-of-band channels such as with I2C/SMBus interfaces. The I2C/SMBus interface may be relatively slow (e.g., feature a lower bandwidth in comparison with other interfaces and associated protocols) for some management operations such passing keys and certificates for security operations (e.g., SPDM operations) and/or other operations such as facilitating firmware upgrades or providing security certificates.

In various embodiments, described herein are systems, methods, and apparatuses that can support direct communication between out-of-band and in-band interfaces and associated devices for device management within a chassis such as an EBOF chassis. In some respects, an Ethernet interface on Ethernet SSDs (Ethernet-based solid state storage devices) may be used for out-of-band management purposes. With other fabric-attached SSDs such as NVMe SSDs, other interfaces such as the SMBus and peripheral component interconnect express (PCIe) interfaces can be used to carry various management protocol messages such as NVMe management interface (NVMe-MI) out-of-band management requests and responses. In various embodiments, the disclosed systems can enable the Ethernet interface of Ethernet-based solid state storage devices to facilitate various management communications such as NVMe-MI protocol based communications, for example, in the context of Ethernet-based solid state storage devices used in a chassis such as an EBOF chassis.

In some respects, in such an EBOF chassis, management of the Ethernet SSDs can be performed via two paths, one out-of-band and another in-band. For out-of-band management, the management of the Ethernet-based solid state storage devices can be performed by a management device such as a BMC via a first interface such as I2C/SMBus interface. For example, this out-of-band management can be performed for MCTP messages in accordance with a protocol such as a DMTF PMCI stack. For the in-band management, the management of the Ethernet-based solid state storage devices can be performed by a host (e.g., an NVMe-oF initiator) via a protocol such as Ethernet. In various embodiments, the disclosed systems can provide a higher-speed and bandwidth path (in comparison to the out-of-band management of the Ethernet-based solid state storage devices by the BMC via the I2C/SMBus interface) for the BMC to manage the Ethernet SSDs inside the EBOF chassis. In particular, the disclosed systems can enable such management by the BMC via Ethernet (e.g., for MCTP messages from DMTF PMCI stack).

As noted, the BMC and Ethernet SSDs may be on separate Ethernet networks. Accordingly, in some embodiments, the disclosed systems include a router (e.g., a software-based router) that can route messages (e.g., MCTP messages) between the BMC and the Ethernet-based solid state storage devices, for example, using information provided in a header of the message blocks. Such messages can then travel over Ethernet via TCP/IP and can be used to manage the Ethernet-based solid state storage devices. It is noted that for the purposes of certain examples herein, MCTP can refer to the transport layer of the DMTF PMCI stack for in-chassis communication; further, that PLDM, SPDM, NVMe-MI, etc. messages can travel over MCTP and over a physical layer such as I2C or PCIe. While this disclosure will focus on certain embodiments using the DMTF PMCI stack for in-chassis communication, it is to be understood that any other suitable protocol that can operate in conjunction with the disclosed embodiments can be included in the scope of the disclosure including, but not limited to, NVMe, NVMe-MI, NVMe-oF, Fibre Channel, and/or the like.

In various embodiments, as noted, the disclosed systems can include a router (e.g., a software based router) that can route traffic in accordance with a first protocol (e.g., MCTP) between a management device such as a BMC and various network-attached storage devices such as Ethernet SSDs. In particular, the router can enable a management path between the BMC and the Ethernet interface of the Ethernet SSDs. Further, the disclosed systems can allow for the use of Ethernet interface information which can be made available to a processor associated with the system such as an EBOF-enabled processor (e.g., a processor implementing a switch network operating system, NOS) from a switch associated with the system such as an Ethernet switch. For example, the disclosed systems can provide Ethernet SSD internet protocol (IP) addresses to the BMC for use by MCTP over TCP.

In various embodiments, the disclosed systems include using a driver (e.g., a MCTP over TCP driver) on each system endpoint (e.g., the BMC and/or Ethernet SSDs) to apply a predetermined metadata and/or header information (e.g., a MCTP over TCP header) to messages transmitted between endpoints. The header can include information about the original source and final destination for routing messages. In one embodiment, the router (e.g., the MCTP over TCP router) associated with the processor (e.g., the EBOF processor) and/or the switch NOS can use the information in header to route traffic to its final destination. In various embodiments, driver associated with the storage devices (e.g., the MCTP over TCP driver associated with an Ethernet SSD) can swap the destination and source information in the MCTP over TCP header for responses. In one embodiment, certain protocol specific messages (e.g., PLDM and other MCTP messages) can be transported over the Ethernet physical layer via TCP/IP and MCTP over TCP. Such messages can include, but not be limited to, SPDM messages which may have an encrypted payloads for secure communication. In some embodiments, the driver (e.g., the MCTP over TCP driver) on the management device (e.g., the BMC) can be configured to use a protocol (e.g., SSDP) to discover the router (e.g., the MCTP over TCP router). The router can provide the storage device (e.g., Ethernet SSD) IP addresses to the management device (e.g., the BMC).

Some technical advantages of the disclosed systems can include, but not be limited to, the following. Allowing a management device such as a BMC to use a faster management path as the primary path (e.g., an in-band communication path), leaving other interfaces such as the I2C/SMBus interfaces for slower out-of-band communications in situations, for example, where the Ethernet-based solid state storage device Ethernet interface is down. Enabling the use of the BMC for management of Ethernet SSDs that do not implement an I2C/SMBus port and interface. Providing faster and more efficient way to manage the EBOF by a management device.

Having discussed certain aspects of the disclosed systems and methods, we turn to the figures, which provide additional views to illustrate various features of the embodiments of the disclosure. FIG. 1 is an illustration of an exemplary of a first view of the disclosed systems for in-band and out-of-band communication for devices associated with a chassis, in accordance with example embodiments of the disclosure. In various aspects, diagram 101 shows a chassis 102, such as a chassis for an EBOF comprising one or more Ethernet SSDs 108. As noted, an EBOF can be used in connection with applications and workloads that benefit from disaggregated low-latency, high bandwidth and highly available storage. In another embodiment the chassis 102 can include a BMC 106, an EBOF processor 104, an Ethernet switch (not shown), and an Ethernet SSD 108. The chassis 102 can include, but not be limited to, a tower server or a rack server. Further, the chassis may include memory (not shown) which can be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc.

The memory may also be any desired combination of different memory types. The memory can be used in connection with the various devices of the chassis (e.g., the BMC, the EBOF processor, and/or the like).

Further, as shown in diagram 101, the EBOF processor 104 can include a switch such as a switch running a network operating system (NOS) 112 and a router such as a MCTP over TCP router 114. The MCTP over TCP router 114 can be configured to communicate with a given Ethernet SSD 108 via an Ethernet ports 116, and to communicate with the BMC 106 via a second Ethernet port 118, for example, via MCTP over TCP. Likewise, the Ethernet SSD can include another Ethernet Port 110 for transmitting messages from the EBOF processor 104 to the MCTP over TCP 128 interface of the Ethernet SSD 108, which can then further process the messages via the MCTP binding 130 layer. The MCTP binding 130 layer can serve to facilitate a connection between the devices to allow for resources (e.g., compute, network, or storage resources) to be exchanged between the devices of the system. Similarly, the BMC 106 can be configured to receive messages from the EBOF processor 104 at a MCTP over TCP 124 interface via Ethernet Port 126. Further, the BMC 106 can include a BMC OS 120 that can use the messages after they are processed at least in part via the MCTP binding 122.

While the disclosure primarily focuses on embodiments associated with Ethernet SSDs 108, it is understood that other storage devices that can operate in connection with the disclosed systems are within the scope of the disclosure. Non-limiting examples of such devices may include Solid State Drives (SSDs), but other storage forms, such as hard disk drives or other long-term storage devices, are also viable. Alternatively or additionally, the devices can include network-attached SSDs that can support using any of a number of different transport protocols, such as Ethernet, Fibre Channel, InfiniBand, or Non-Volatile Memory Express (NVMe), to name a few possibilities, but in some embodiments, network-attached SSDs may be limited to a subset of these transport protocols (possibly one: for example, an Ethernet SSD). Further, embodiments of the disclosure may support any desired number of devices. In addition, other devices, such as network interface cards (NICs) may be substituted for or included in addition to network-attached SSDs. In the remainder of this document, any reference to Ethernet SSDs can be substituted to encompass any alternative device that may be subject to discovery as an NVMe-oF device and may be substituted for network-attached.

Further, while the disclosed systems are directed to a BMC in chassis, BMC is one possible proxy for processor performing any suitable operations (e.g., management operations) associated with the chassis and storage devices. Other possible devices may include a Redundant Array of Independent Disks (RAID) controller, another processor (typically different from processor, which would be involved in performing start-up operations), or even a software proxy. As used herein, any reference to BMC is intended to also refer to these other devices, as well as any other devices that may act as a proxy for processor. In some embodiments, the BMC or any management device performing the operations described herein may not necessarily be a standalone component and may be integrated into other processors (e.g., management processor such as the EBOF processor) or computational components associated with the chassis. For example, the management processor (e.g., the EBOF processor) can include software instructions that perform operations described herein in connection with the BMC or any suitable management device. In some embodiments, the management processor (or equivalent) can include a local EBOF processor that may be used as a software defined networking to manage the Ethernet switch and in some cases also used as a service management processor to manage the entire chassis without the BMC. In some systems, the local processor may be used to manage the Ethernet switch and use BMC to manage the entire chassis or a portion of the chassis.

Further, while the above EBOF processor was described in connection with the embodiments discussed above, the EBOF processor can include any suitable processing element. Further, such a processing element may also be coupled to memory, which may include random access memory (RAM), read-only memory (ROM), or other state preserving media, as examples. Processors may also be coupled to storage devices, and to network connector, which may be, for example, an Ethernet connector or a wireless connector. The processing element may also be connected to a bus, to which may be attached user interface and input/output interface ports that may be managed using input/output engine, among other components.

Figure 2:
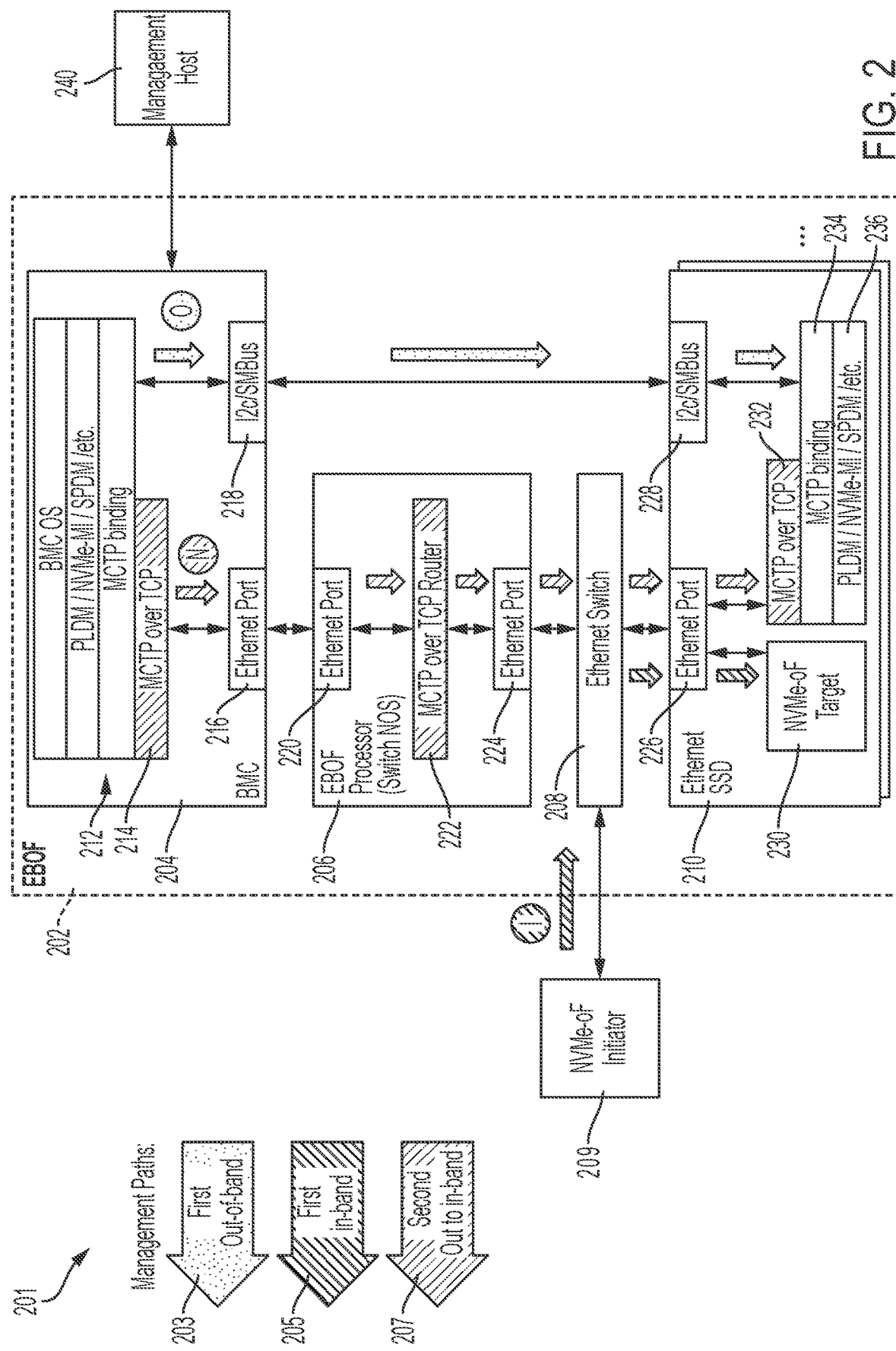
FIG. 2 is an illustration of an exemplary second view of the disclosed systems for in-band and out-of-band communication for devices associated with a chassis, in accordance with example embodiments of the disclosure.

FIG. 2 is an illustration of an exemplary second view of the disclosed systems for in-band and out-of-band communication for devices associated with a chassis, in accordance with example embodiments of the disclosure. In some embodiments, diagram 201 can also show a chassis 202 in a second view that is more detailed than the first view of FIG. 1, as further shown and described below. In one example embodiment, BMC 204 can further include a first stack 212 including a BMC OS, a protocol block such as a PLDM/NVMe-MI/SPDM/etc. 212 block, a binding layer such as a MCTP binding, and a MCTP over TCP 214 layer. As used herein, layer and block may be used interchangeably. In one embodiment, the BMC 204 can communicate with the EBOF processor 206 via an Ethernet port 216 on the BMC 204. In particular, the Ethernet port 216 can communicate information from the MCTP over TCP 214 layer through an Ethernet port 220 of the EBOF processor 206 to a corresponding MCTP over TCP router 222 within the EBOF processor 206.

Similarly, the MCTP over TCP router 222 of the EBOF processor 206 can communicate with an Ethernet switch 208 via another Ethernet port 224 of the EBOF processor 206. Further, the Ethernet switch 208 can communicate with the Ethernet SSD 210 via the Ethernet port 226 of the Ethernet SSD 210. In particular, the Ethernet switch 208 can be configured to communicate both in-band and out-of-band information. For example, the Ethernet switch 208 can be configured to transport first in-band information 205 from an NVMe-oF initiator 209 to an NVMe-oF target 230 of the Ethernet-based solid state storage device 210. Alternatively or additionally, the Ethernet switch 208 can be configured to transport second out to in-band information 207 (e.g., in-band information that could be transmitted via first out-of-band information 203) through the Ethernet port 226 of the Ethernet SSD 210 to a MCTP over TCP 232 layer of the Ethernet SSD 210. The MCTP over TCP layer 232 can be part of the stack including a MCTP binding 234 layer, and a PLDM/NVMe-MI/SPDM/etc. 236 layer. In some embodiments, the Ethernet port 226 can include any suitable physical connector including, but not limited to, a SFF-8201 connector, a SFF-8223 connector, a SFF-8301 connector, a SFF-8323 connector, and/or a SFF-100x connector.

In some respects, the disclosed systems can be configured to transport second out to in-band information 207 from the BMC 204 to the EBOF processor 206 through the Ethernet switch 208 and ultimately to the Ethernet SSD 210. Further, the disclosed systems can be configured to transport first out-of-band information 203 through respective I2C/SMBus ports 218 and 228 of the BMC 204 and the Ethernet SSD 210, respectively. In particular, such out-of-band information 203 can be transmitted from the MCTP binding layer of the stack 212 of the BMC 204 to the MCTP binding 234 layer of the Ethernet SSD 210. Moreover the BMC 204 may be configured to be connected to a management host 240. This management host 240 can transmit various management related information through the BMC 204 to the Ethernet SSD 210 via respective ports (for example, the I2C/SMBus ports 218 and 228).

Figure 3:
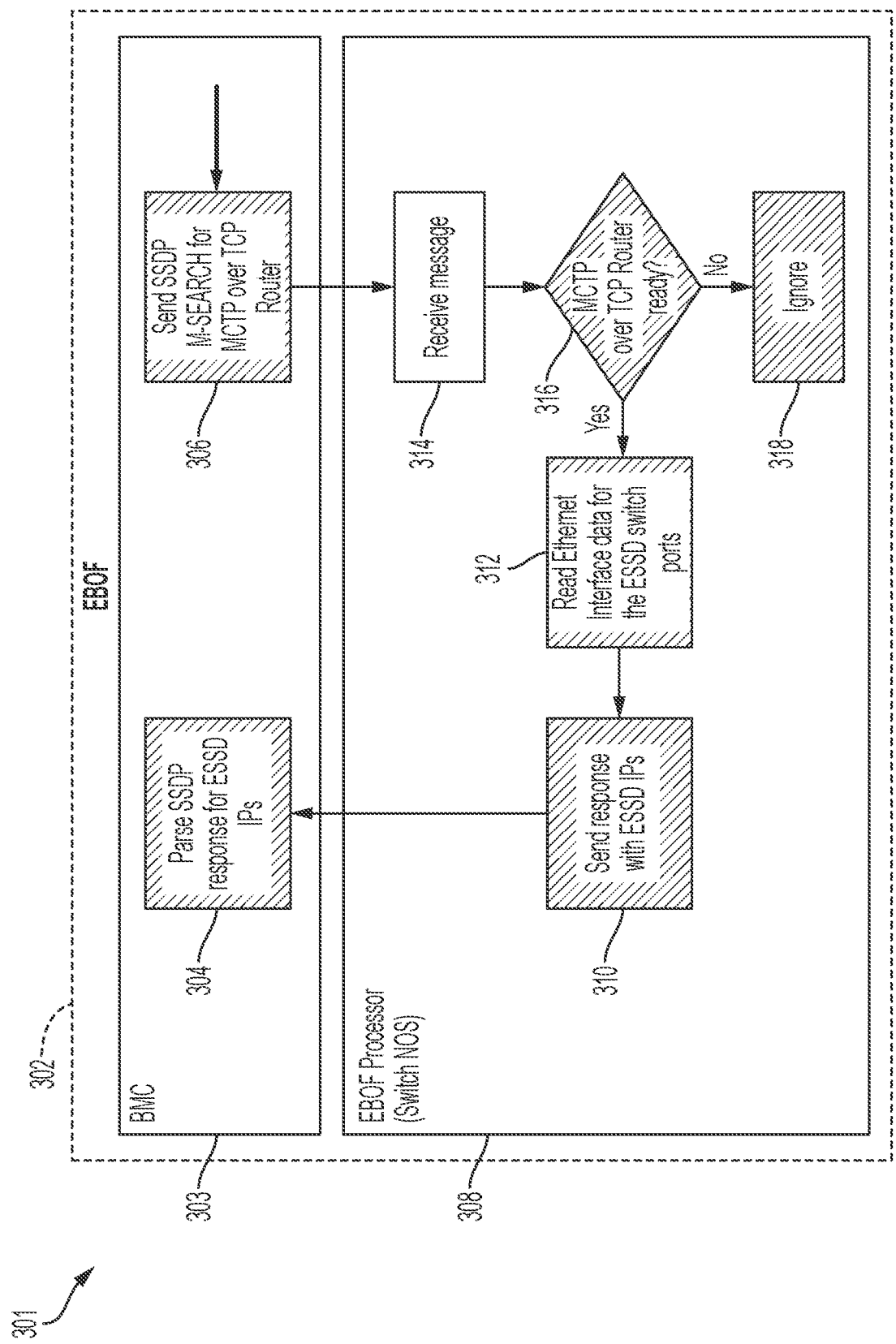
FIG. 3 is an illustration of an example flowchart illustrating example operations for information exchange between a management device such as a baseboard management component (BMC) and a processor (e.g., a processor associated with the chassis), in accordance with example embodiments of the disclosure.

FIG. 3 is an illustration of an example flowchart illustrating example operations for information exchange between a management device such as a baseboard management component (BMC) and a processor (e.g., a processor associated with the chassis), in accordance with example embodiments of the disclosure. In particular, diagram 301 shows a portion of an EBOF 302 system (e.g., chassis). The portion of the EBOF 302 system can include a management device such as a BMC 303 and a processor such as an EBOF processor 308 which can implement a switch NOS. As shown in diagram 301, the BMC 303 can, at block 306, send a secure searching command over a given protocol such as an SSDP M-Search command for MCTP over TCP to find a router. The EBOF processor 308 can, at block 314, receive a message in response to the search. Further, the EBOF processor 308 can, at block 316, determine whether the received message is ready for processing by the MCTP over TCP router. If it is determined that the message is not ready for processing, then at block 318, the EBOF processor 308 can ignore the message. If, on the other hand, it is determined that the message is ready for processing, then the EBOF processor 308 can, at block 312, read relevant interface data associated with ports of the device such as reading the Ethernet interface data for the Ethernet-based solid state storage device switch ports. Further, the EBOF processor 308 can, at block 310, send a response to the BMC 303 with the corresponding Ethernet-based solid state storage device IP addresses. At block 304, the BMC 303 can parse SSDP responses for the Ethernet-based solid state storage devices based on the respective IP addresses. The BMC 303 can then, with the IP addresses, route relevant information to a given Ethernet-based solid state storage device in accordance with the protocol. The information that is sent can be in-band information, as described variously herein.

Figure 4:
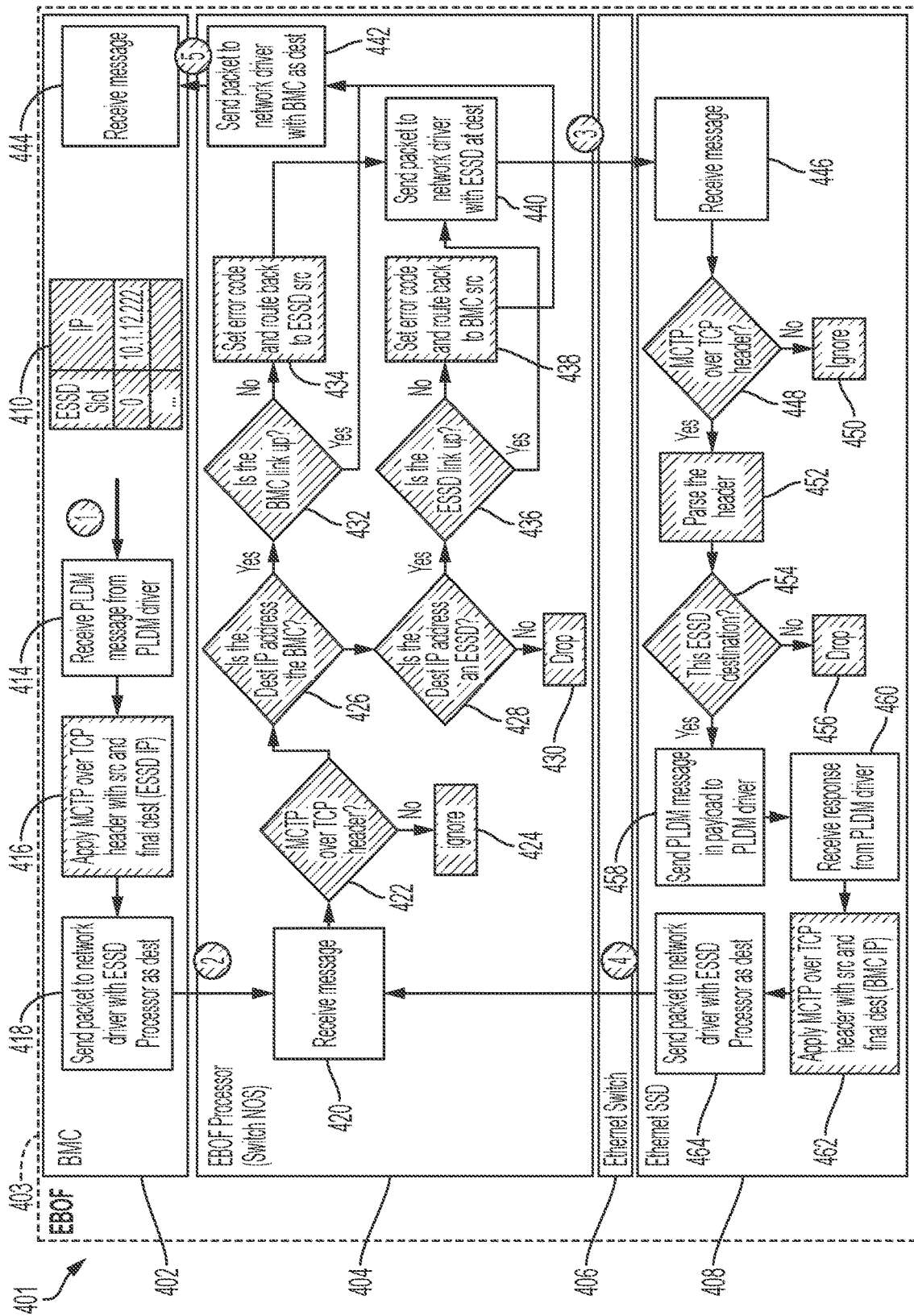
FIG. 4 shows an example flowchart illustrating example operations for information exchange between a BMC and a network-attached storage device such as an Ethernet solid state drive (SSD), in accordance with example embodiments of the disclosure.

FIG. 4 shows an example flowchart illustrating example operational flow of information between the BMC and the Ethernet SSD, in accordance with example embodiments of the disclosure. In particular, diagram 401 shows an EBOF chassis 403, and the EBOF chassis 403 can include a BMC 402, an EBOF processor 404, an Ethernet switch 406, and an Ethernet-based solid state storage device 408. In particular, the BMC can be configured to access a table 410 to determine various IP addresses associated with different Ethernet-based solid state storage device slots and ports. The disclosed systems can, at block 414, receive and use the information obtained from the table 410 and a PLDM message received from a PLDM driver to kick start the process of transmitting information from the BMC 402 to the Ethernet SSD 408. At block 416, the BMC can be configured to apply MCTP over TCP header information along with information designating the source and the final destination (e.g., the Ethernet-based solid state storage device IP address) for the information packets being transmitted. At block 418, the BMC can be configured to send the packet to a network driver with Ethernet-based solid state storage device processor serving as the destination.

At block 420, the EBOF processor can be configured to receive the message from the BMC, and can be further configured, at block 422, to determine whether the message includes n MCTP over TCP header. If it is determined, at block 422, that the message does not include a MCTP over TCP header, the EBOF processor can be configured, at block 424, to ignore the message. Alternatively, if it is determined, at block 422, that the message includes a MCTP over TCP header, the disclosed systems can be configured to determine, at block 426, whether the destination IP address associated with a message is addressed to the BMC. If it is determined, at block 426, that the destination IP address does not belong to the BMC, the disclosed systems can, at block 428, determine whether the destination IP address is an Ethernet-based solid state storage device.

If it is determined, at block 428, that the destination IP address does not include Ethernet-based solid state storage device, the disclosed systems can be configured, at block 430, to drop the message. If on the other hand, at block 428, it is determined that the destination IP address includes the BMC, then at block 436, the disclosed systems can determine whether the BMC is linked up. If it is determined, at block 436, that the BMC is not linked up, then the disclosed systems can, at block 438, set an error code and route the information back to the Ethernet-based solid state storage device source. If on the other hand, it is determined at block 436, that the BMC is linked up, then the disclosed systems can be configured, at block 442, to transmit a packet to the network driver with the BMC as a destination. Further, the BMC can be configured to receive message as shown in block 444.

At block 440, the EBOF processor can be configured to send a packet to the network driver with the Ethernet-based solid state storage device as the destination based on the outcome determined at blocks 432 and 434. At block 446, the Ethernet SSD can be configured to receive a message from the EBOF processor through the Ethernet switch 406. At block 448, the Ethernet SSD can be configured to determine whether the received message includes a MCTP over TCP header information 448. If it is determined, at block 448, that the message does not include MCTP over TCP header information, then the Ethernet SSD can ignore the message, as shown in block 450. If it is determined at block 448 that the message includes MCTP over TCP header information than the Ethernet SSD can parse the header information as shown at block 452.

Further at block 454, the Ethernet-based solid state storage device can determine based on the header information whether the Ethernet-based solid state storage device is the destination. If it is determined that the Ethernet-based solid state storage device is not the final destination, then the Ethernet SSD can drop the message as shown at block 456. If on the other hand it is determined that the Ethernet SSD is the destination, then the Ethernet SSD can, at block 458, send a PLDM message in a payload to the PLDM driver associated with the Ethernet SSD. At block 460, the Ethernet SSD can be configured to receive a response from the PLDM driver. From there, the Ethernet SSD can determine, at block 462, to apply and MCTP over TCP header information with the source and final destination (BMC IP address) indicated. From there, at block 464, the Ethernet SSD can send a packet to a network driver with the Ethernet-based solid state storage device processors serving as the destination.

This packet can be transmitted through the Ethernet switch to the EBOF processor which receives the message at block 420.

Figure 5:
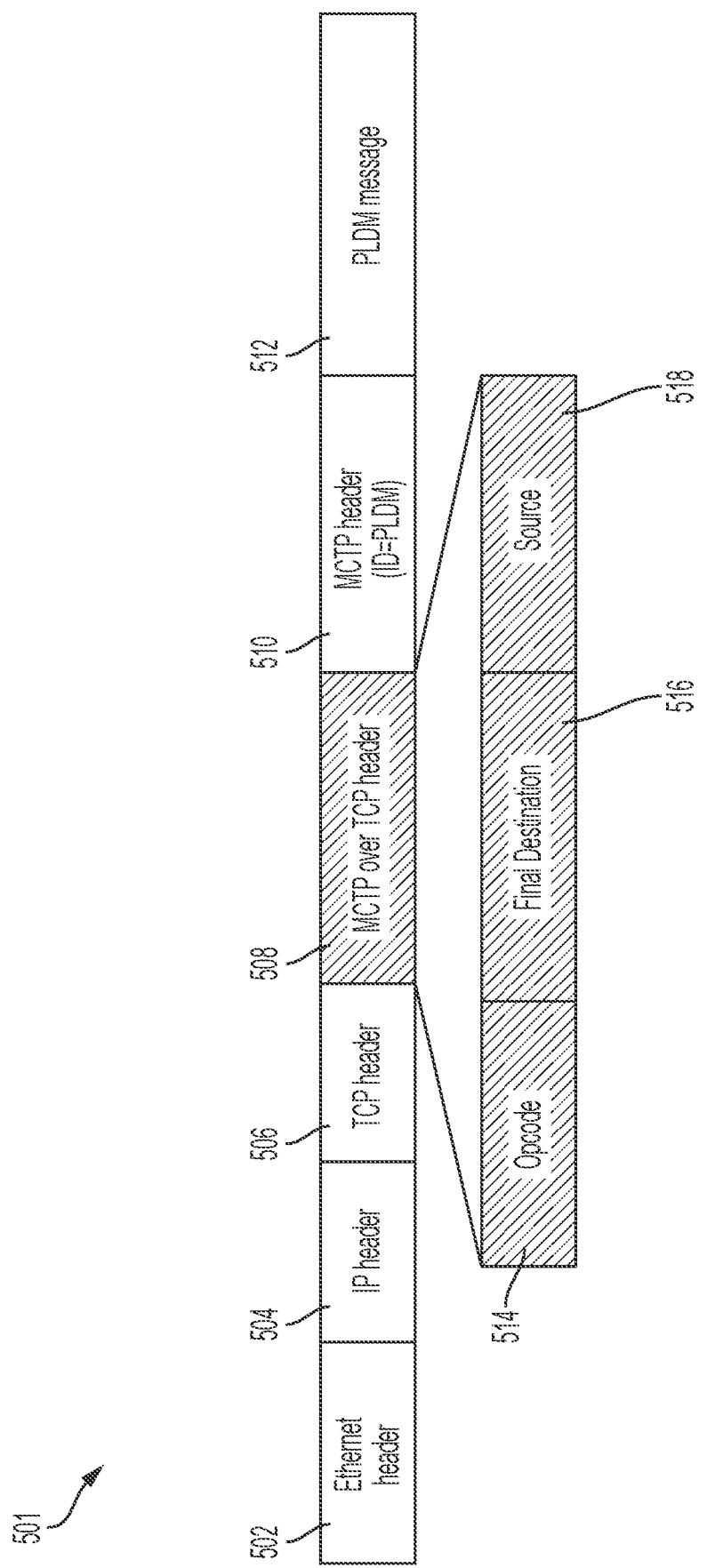
FIG. 5 shows a diagram of a packet of information that can be transmitted between various portions of the disclosed systems, in accordance with example embodiments of the disclosure.

FIG. 5 shows a diagram 501 of a packet of information that can be transmitted between various portions of the disclosed systems, in accordance with example embodiments of the disclosure. In particular, the packet can include an Ethernet header 502, an IP header 504, a TCP header 506, and MCTP over TCP header 508, and MCTP header 510, and a PLDM message 512. Further the MCTP over TCP header 508 can include an opcode 514, a final destination 516, and a source 518. In an embodiment the opcode 514 can include information such as a request, a response, and error, and/or the like. In another embodiment, the final destination 516 can include an IP address associated with the BMC or an Ethernet SSD. In another aspect, the source 518 can include an IP address associated with the BMC for the Ethernet SSD.

Figure 6:
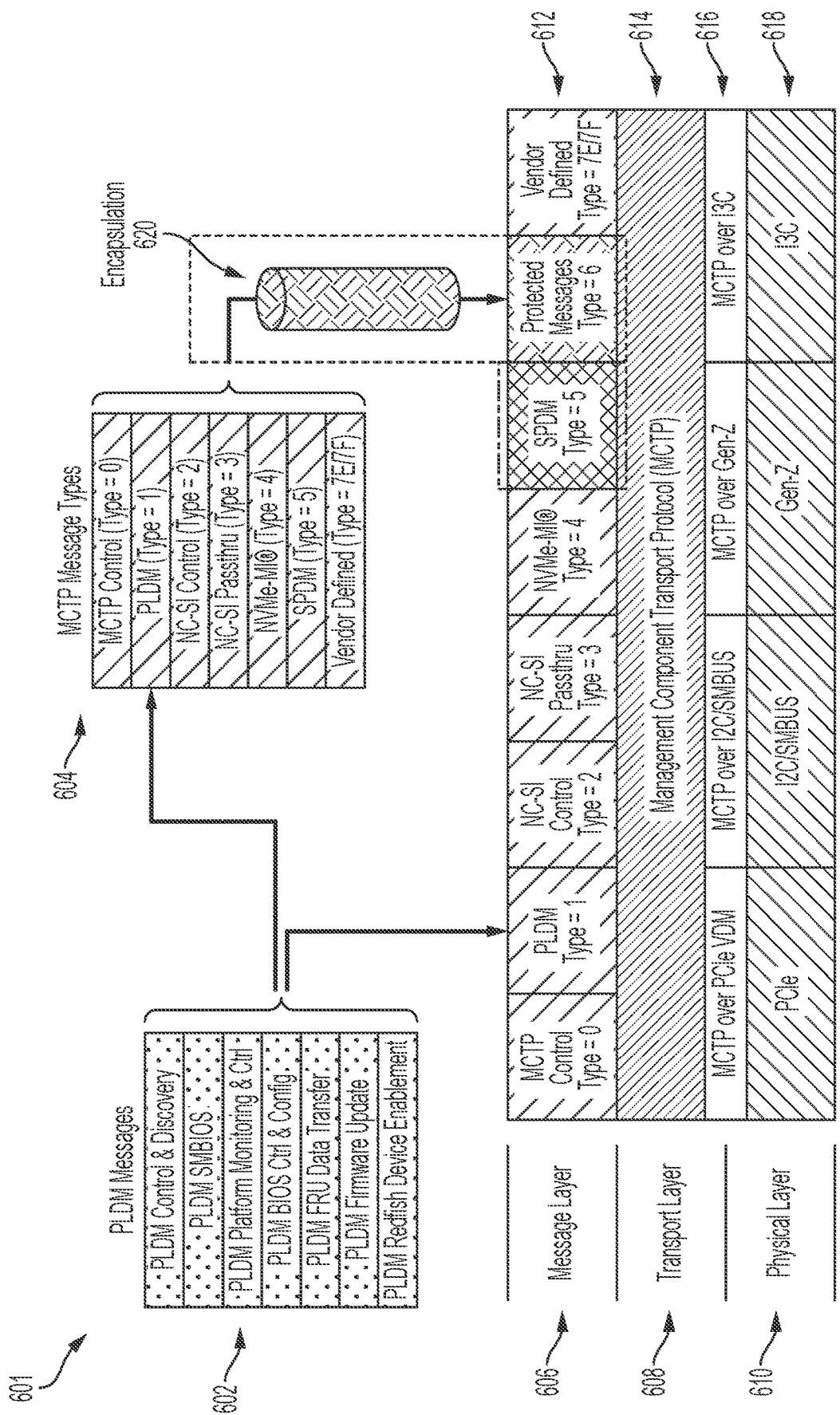
FIG. 6 is an illustration of an exemplary features of a chassis-related protocol stack, in accordance with example embodiments of the disclosure.

FIG. 6 is an illustration of an exemplary protocol specific implementation that can be used with the disclosed systems, in accordance with example embodiments of the disclosure. In various embodiments, the PCMI stack can be operable in connection with standards that can be used for communications between the platform components (e.g., devices in the chassis). Diagram 601 shows a schematic diagram including an example and PLDM messages 602 and MCTP message 604 types that can be used in connection with the disclosed systems. Further shown and described in connection with diagram 601 are the various message layer 606, transport layer 608, and physical layer 610 associated with the devices in the chassis (e.g., storage device, management processor, management device, etc.). Moreover, the message layer components 612, transport layer components 614, first physical layer components 616 and second physical layer components 618 are shown.

In various embodiments, PLDM messages 602 can include information associated with control and discovery, BIOS-related information, platform monitoring and control, BIOS control and configuration, field-replacement unit (FRU) data transfer, firmware update information, and device enablement information. In one embodiment, MCTP message 604 can include control information, PLDM related information, network controller sideband interface (NC-SI) control and pass-through information, NVMe-MI information, security (SPDM related) information, and/or vendor defined information. In some embodiments, MCTP message 604 can be encapsulated 620 for transmission over the message layer 606, for example, as a protected message (e.g., type 6).

In various embodiments, message layer 606 can include MCTP control messages, PLDM messages, NC-SI messages, NVMe-MI messages, SPDM messages, protected messages (e.g., MCTP messages encapsulated via the header information described above in connection with FIG. 5), and vendor defined messages. In some embodiments, the MCTP Control Protocol is used to set up and initialize managed devices within a MCTP network. Further, PLDM can serve to provide access to low-level platform monitoring, control, and data transfer functions such as temperature, fan, voltage, inventory data, event data transfer, and boot control, and/or the like. Further, PLDM over MCTP can include data representations and commands associated with the platform management hardware. NC-SI defines a pass-through model of Ethernet communications between a management controller and a network controller. Further, SPDM defines a set of commands for authentication, firmware measurements, and certificate management.

In one embodiment, transport layer 608 can include a MCTP protocol. As noted, the MCTP Protocol can be used for managing devices within a MCTP network. The MCTP protocol can be independent of the underlying physical bus properties, as well as the "data-link" layer messaging used on the bus. Further, the transports defines a message passing protocol. The MCTP transport can support both acknowledged (e.g., request/response) and unacknowledged messages (e.g., asynchronous). MCTP can include binding specifications, which define the necessary header and timing requirements for the transport to be used on the applicable physical mediums. The bindings can be different for different physical media, such as MCTP over PCIe VDM Binding and MCTP over SMBus/I2C Binding. The physical and data-link layer methods for MCTP communication across a given medium are be describe by transport binding features, such as MCTP over PCIe Vendor Defined Messaging (VDM) and MCTP over SMBus/I2C. The disclosed systems can further be used with additional buses such as USB, and others.

In various embodiments, physical layer 610 can include PMCI standards and protocols as implemented on a physical medium. In various embodiments, the physical mediums represent available interconnects that the MCTP specification can be used with. In one embodiment, message layer components 612 can include MCTP control information, PLDM information, NC-SI control information, NC-SI pass-through information, NVMe-MI information, SPDM information, protected messages (e.g., messages encapsulated via the header information described in connection with FIG. 5, above), and vendor defined information. In various embodiments, transport layer components 614 can include MCTP. In one embodiment, first physical layer components 616 can include MCTP over PCIe VDM, MCTP over I2C/SMBus, MCTP over Gen-Z, and MCTP over I3C. In various embodiments, second physical layer components 618 can include PCIe, I2C/SMBus, Gen-Z, and I3C.

Figure 7A:
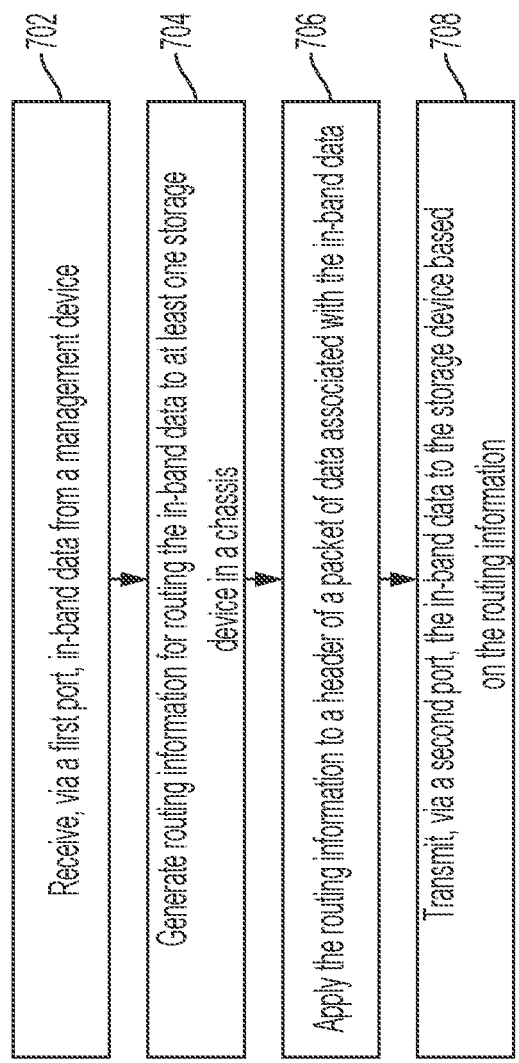
FIG. 7A is an illustration of an exemplary operational flow illustrating example operations associated with the disclosed systems, in accordance with example embodiments of the disclosure.

FIG. 7A is an illustration of an exemplary operational flow illustrating example operations associated with the disclosed systems, in accordance with example embodiments of the disclosure. In some embodiments, the operational flow associated with FIG. 7A can be performed substantially by a management processor such as the EBOF processor or similar device described herein. At block 702, the disclosed systems can receive, via a first port, in-band data from a management device. In some embodiments, the management device can include a BMC device. At block 704, the disclosed systems can generate routing information for routing the in-band data to at least one storage device in a chassis. At block 706, the disclosed systems can apply the routing information to a header of a packet of data associated with the in-band data. In various embodiments, the header can include a Management Component Transport Protocol (MCTP) over Transmission Control Protocol (TCP) based information and the packet is transmitted to the management processor via a TCP Internet Protocol (IP) over Ethernet protocol. Further, the routing information can include IP addresses associated with endpoint devices such as a given Ethernet-based solid state storage device in the chassis. At block 708, the disclosed systems can transmit, via a second port, the in-band data to the storage device based on the routing information. Further, in various embodiments, the in-band data can be transmitted to a second storage device of the storage devices via a switch. In some embodiments, the in-band data can include a firmware upgrade.

Figure 7B:
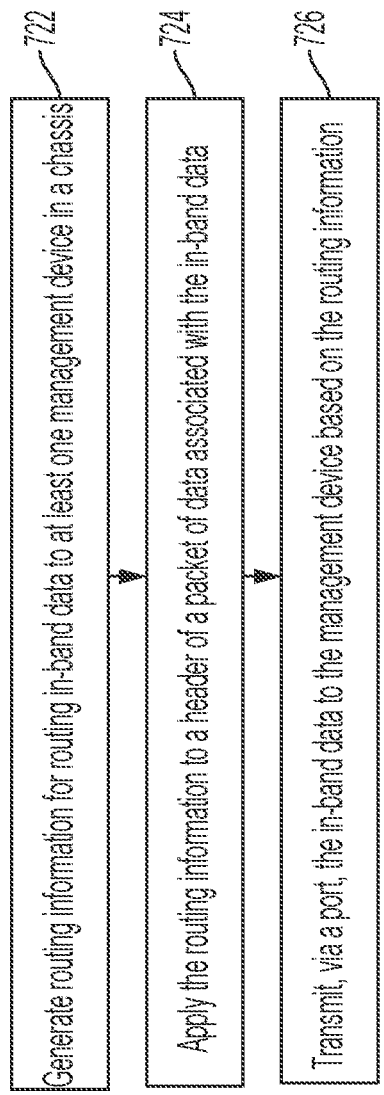
FIG. 7B is an illustration of another exemplary operational flow illustrating example operations associated with the disclosed systems, in accordance with example embodiments of the disclosure.

FIG. 7B is an illustration of another exemplary operational flow illustrating example operations associated with the disclosed systems, in accordance with example embodiments of the disclosure. In some embodiments, the operational flow associated with FIG. 7B can be performed substantially by a storage device such as an Ethernet-based solid state storage device or other network-attached storage device. At block 722, the disclosed systems can generate routing information for routing in-band data to at least one management device in a chassis. At block 724, the disclosed systems can apply the routing information to a header of a packet of data associated with the in-band data. In various embodiments, the header can include a Management Component Transport Protocol (MCTP) over Transmission Control Protocol (TCP) based information and the packet is transmitted to the management processor via a TCP Internet Protocol (IP) over Ethernet protocol. At block 726, the disclosed systems can transmit, via a port, the in-band data to the management device based on the routing information. Further, in various embodiments, the in-band data can be transmitted to a second storage device of the storage devices via a switch. In some embodiments, the in-band data can include a firmware upgrade.

Figure 8:
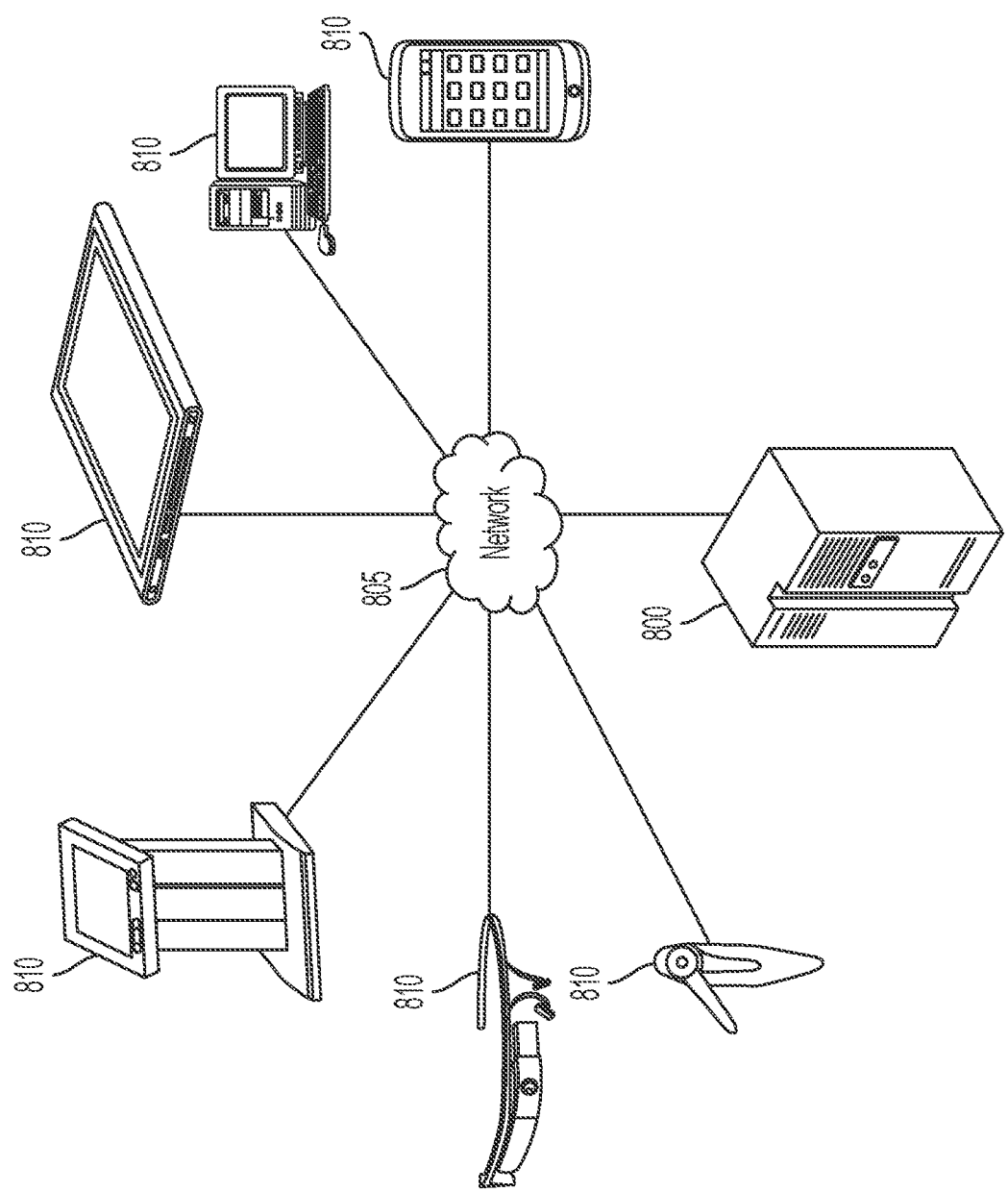
FIG. 8 shows an example schematic diagram of a system that can be used to practice embodiments of the present disclosure.

FIG. 8 shows an example schematic diagram of a system that can be used to practice embodiments of the present disclosure. As shown in FIG. 8, this particular embodiment may include one or more management computing entities 800, one or more networks 805, and one or more user devices 810. In various embodiments, the management computing entities 800 can be configured to run operations associated with the disclosed systems and associated embodiments described throughout the disclosure. Further, the management computing entities 800 can reside in any suitable portion of the disclosed systems (e.g., management device such as BMC, management processor such as EBOF processor, storage device such as Ethernet-based solid state storage device, a remote host, another device, combinations thereof, and/or the like). Each of these components, entities, devices, systems, and similar words used herein interchangeably may be in direct or indirect communication with, for example, one another over the same or different wired or wireless networks. Additionally, while FIG. 8 illustrates the various system entities as separate, standalone entities, the various embodiments are not limited to this particular architecture. Further, the management computing entities 800 can include the machine learning components described herein. As noted, the communications can be performed using the any suitable protocols described further herein.

Figure 9:
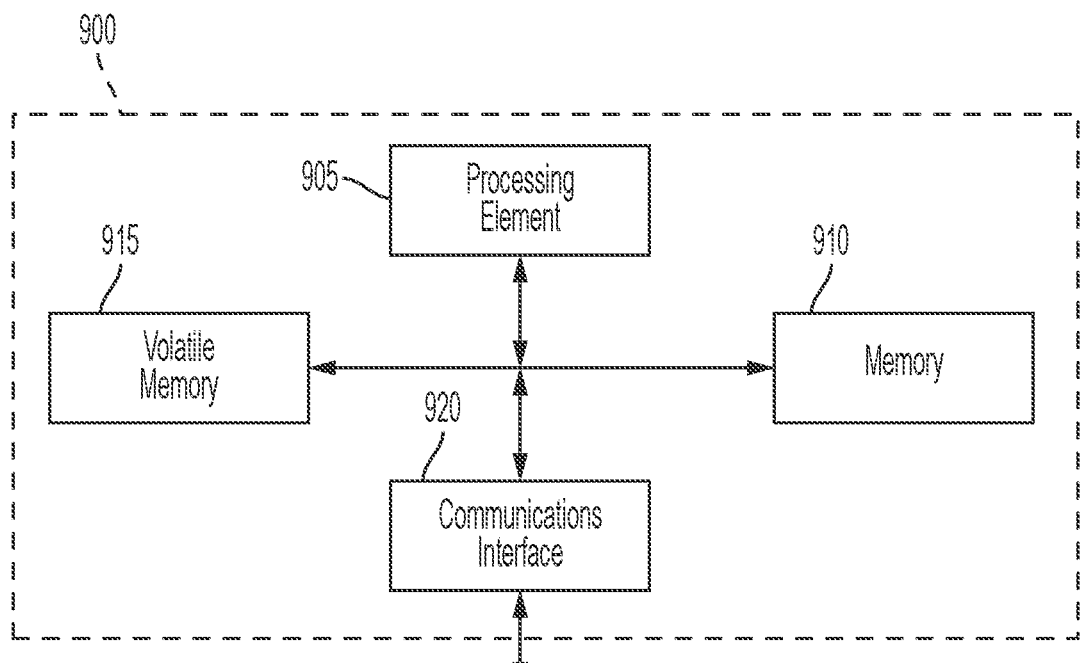
FIG. 9 shows an example schematic diagram of a management computing entity, in accordance with example embodiments of the disclosure.

FIG. 9 shows an example schematic diagram of a management computing entity, in accordance with example embodiments of the disclosure. As noted, the management computing entity can be configured to run operations associated with the disclosed systems and associated embodiments described throughout the disclosure. Further, the management computing entities 900 (similar to management computing entity 800 shown in FIG. 8) can reside in any suitable portion of the disclosed systems. In particular, a content component may serve to determine signals indicative of data (e.g., video, audio, text, data, combinations thereof, and/or the like) to be transmitted over the system described herein. In another embodiment, the determination of the signal for transmission may be, for example, based on a user input to a device, a predetermined schedule of data transmissions on a network associated with the system, changes in network conditions, and the like. In one embodiment, the signal may include that data may be encapsulated in a data frame and/or packet that is configured to be sent from a device to one or more devices on the network.

In another embodiment, the processing element 905 may serve to determine various parameters associated data transmitted over the network associated with the disclosed systems. As another example. the processing element 905 may serve to run a model on the network data, run a machine learning technique on parameters associated with different performance capabilities of the clusters of the network, determine distributions of workloads to be processed by various clusters of the portions of the network architecture, combinations thereof, and/or the like.

In one embodiment, a transmitting component (not shown) may serve to transmit the signal from one device to another device on the network. For example, the transmitting component may serve to prepare a transmitter (e.g., transmitter 1204 of FIG. 12, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 900 may also include one or more communications interfaces 920 for communicating with various computing entities, such as by communicating data, content, information, and/or similar terms used herein interchangeably that can be transmitted, received, operated on, processed, displayed, stored, and/or the like. For instance, the management computing entity 900 may communicate with user devices and/or a variety of other computing entities.

As shown in FIG. 9, in one embodiment, the management computing entity 900 may include or be in communication with one or more processing elements 905 (also referred to as processors, processing circuitry, and/or similar terms used herein interchangeably) that communicate with other elements within the management computing entity 900 via a bus, for example. As will be understood, the processing element 905 may be embodied in a number of different ways. For example, the processing element 905 may be embodied as one or more complex programmable logic devices (CPLDs), microprocessors, multi-core processors, coprocessing entities, application-specific instruction-set processors (ASIPs), microcontrollers, and/or controllers. Further, the processing element 905 may be embodied as one or more other processing devices or circuitry. The term circuitry may refer to an entirely hardware embodiment or a combination of hardware and computer program products. Thus, the processing element 905 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 905 may be configured for a particular use or configured to execute instructions stored in volatile or non-volatile media or otherwise accessible to the processing element 905. As such, whether configured by hardware or computer program products, or by a combination thereof, the processing element 905 may be capable of performing steps or operations according to embodiments of the present disclosure when configured accordingly.

In one embodiment, the management computing entity 900 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 910, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 900 may further include or be in communication with volatile media (also referred to as volatile storage, memory, memory storage, memory circuitry and/or similar terms used herein interchangeably). In one embodiment, the volatile storage or memory may also include one or more volatile storage or memory media 915, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 905. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 900 with the assistance of the processing element 905 and operating system.

As indicated, in one embodiment, the management computing entity 900 may also include one or more communications interfaces 920 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 800 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, 5G protocol, wireless universal serial bus (USB) protocols, and/or any other wireless protocol.

Although not shown, the management computing entity 900 may include or be in communication with one or more input elements, such as a keyboard input, a mouse input, a touch screen/display input, motion input, movement input, audio input, pointing device input, joystick input, keypad input, and/or the like. The management computing entity 900 may also include or be in communication with one or more output elements (not shown), such as audio output, video output, screen/display output, motion output, movement output, and/or the like.

As will be appreciated, one or more of the management computing entity's 900 components may be located remotely from other management computing entity 900 components, such as in a distributed system. Furthermore, one or more of the components may be combined and additional components performing functions described herein may be included in the management computing entity 900. Thus, the management computing entity 900 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device that includes one or more components that are functionally similar to those of the management computing entity 900.

In various aspects, the processing component, the transmitting component, and/or the receiving component (not shown) may be configured to operate on one or more may include aspects of the functionality of the management computing entity, as shown and described in connection with FIGS. 8 and 9 here. In particular, the processing component, the transmitting component, and/or the receiving component may be configured to be in communication with one or more processing elements 905, memory 910, volatile memory 915, and may include a communication interface 920 (e.g., to facilitate communication between devices).

Figure 10:
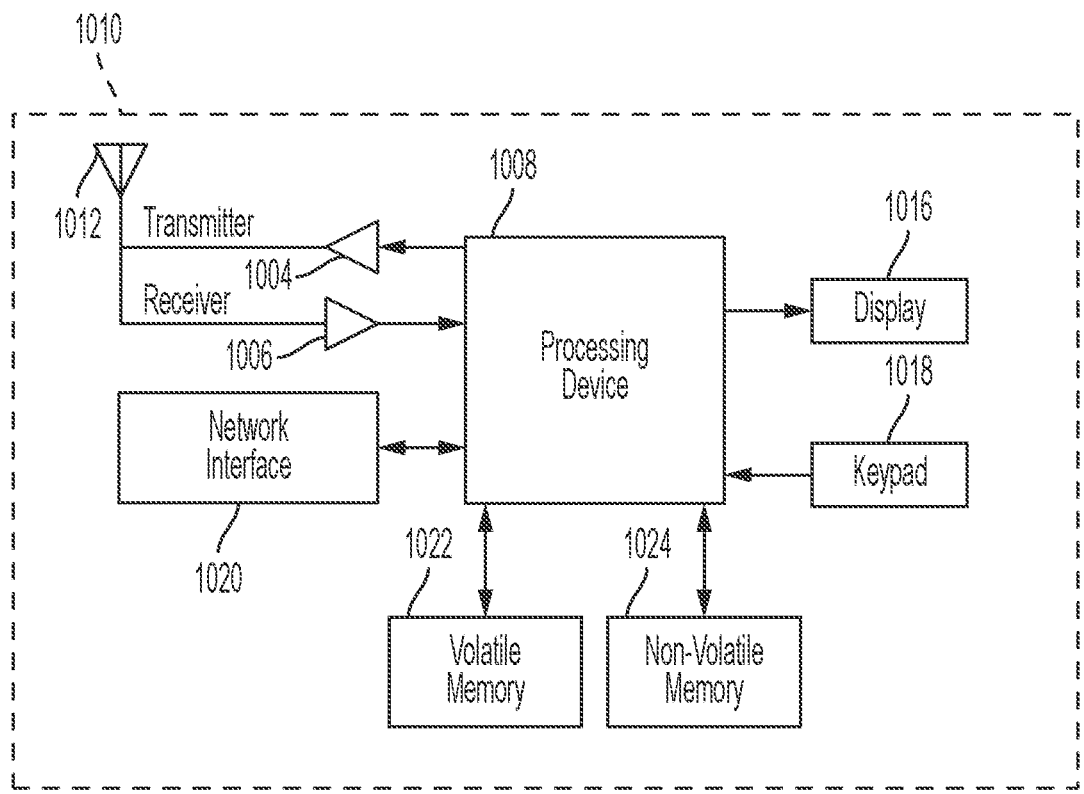
FIG. 10 shows an example schematic diagram of a user device, in accordance with example embodiments of the disclosure.

FIG. 10 shows an example schematic diagram of a user device, in accordance with example embodiments of the disclosure. FIG. 10 provides an illustrative schematic representative of a user device 1010 (shown in connection with FIG. 10) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 1010 can be operated by various parties. As shown in FIG. 10, the user device 1010 can include an antenna 1012, a transmitter 1004 (for example radio), a receiver 1006 (for example radio), and a processing element 1008 (for example CPLDs, FPGAs, microprocessors, multi-core processors, coprocessing entities, ASIPs, microcontrollers, and/or controllers) that provides signals to and receives signals from the transmitter 1004 and receiver 1006, respectively.

The signals provided to and received from the transmitter 1004 and the receiver 1006, respectively, may include signaling information in accordance with air interface standards of applicable wireless systems. In this regard, the user device 1010 may be capable of operating with one or more air interface standards, communication protocols, modulation types, and access types. More particularly, the user device 1010 may operate in accordance with any of a number of wireless communication standards and protocols, such as those described above with regard to the management computing entity 900 of FIG. 9. In a particular embodiment, the user device 1010 may operate in accordance with multiple wireless communication standards and protocols, such as the disclosed IoT DOCSIS protocol, UMTS, CDMA2000, 1xRTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 1010 may operate in accordance with multiple wired communication standards and protocols, such as those described above with regard to the management computing entity 900 via a network interface 1020.

Via these communication standards and protocols, the user device 1010 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 1010 can also download changes, add-ons, and updates, for instance, to its firmware, software (for example including executable instructions, applications, program components), and operating system.

According to one embodiment, the user device 1010 may include location determining aspects, devices, components, functionalities, and/or similar words used herein interchangeably. The location determining aspects may be used to inform the models used by the management computing entity and one or more of the models and/or machine learning techniques described herein. For example, the user device 1010 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 1010 position in connection with a variety of other systems, including cellular towers, Wi-Fi access points, and/or the like. Similarly, the user device 1010 may include indoor positioning aspects, such as a location component adapted to acquire, for example, latitude, longitude, altitude, geocode, course, direction, heading, speed, time, date, and/or various other information/ data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 1010 may also comprise a user interface (that can include a display 1016 coupled to a processing element 1008) and/or a user input interface (coupled to a processing element 1008). For example, the user interface may be a user application, browser, user interface, and/or similar words used herein interchangeably executing on and/or accessible via the user device 1010 to interact with and/or cause display of information from the management computing entity 900, as described herein. The user input interface can comprise any of a number of devices or interfaces allowing the user device 1010 to receive data, such as a keypad 1018 (hard or soft), a touch display, voice/speech or motion interfaces, or other input devices. In embodiments including a keypad 1018, the keypad 1018 can include (or cause display of) the conventional numeric (0-9) and related keys (#, *), and other keys used for operating the user device 1010 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 1010 can also include volatile storage or memory 1022 and/or non-volatile storage or memory 1024, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1010. As indicated, this may include a user application that is resident on the entity or accessible through a browser or other user interface for communicating with the management computing entity 900 and/or various other computing entities.

In another embodiment, the user device 1010 may include one or more components or functionality that are the same or similar to those of the management computing entity 900, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for storage, comprising:
    a chassis comprising storage devices for storing data;
    a management processor that determines routing information for routing in-band data to a storage device of the storage devices; and
    a management device that performs communication management, wherein the management device:
        transmits, via a first port, in-band data to the storage device based on the routing information, the in-band data, transmitted to the storage device, comprising a management operation comprising a data update; and
        transmits, via a second port, out-of-band data to the storage device,
    wherein the first port corresponds to a first path comprising a higher bandwidth storage path than a second path corresponding to the second port,
    wherein the first path comprises the management processor connected between the management device and the storage device,
    wherein the first port and the second port connect to different layers of a protocol stack within the storage device, and
    wherein:
        the first port is connected to a first layer, a binding layer, and a platform level data model (PLDM) layer of the protocol stack within the storage device; and
        the second port is connected to the binding layer and the PLDM layer within the storage device.

2. The system of claim 1, wherein the management processor comprises an Ethernet bunch of flash (EBOF) processor and the management device comprises at least one of a baseboard management controller (BMC), a field-programmable array (FPGA), an application specific integrated circuit (ASIC), or a processor.

3. The system of claim 1, wherein the system further comprises a switch, and the management processor routes the in-band data from the management device to a second storage device of the storage devices via the switch.

4. The system of claim 3, wherein the switch receives second in-band data from a host and the switch transmits the second in-band data to the second storage device.

5. The system of claim 4, wherein the host comprises a non-volatile memory express over fabric (NVMe-oF) initiator and the storage device comprises an NVMe-oF target.

6. The system of claim 1, wherein the storage device comprises a third port to receive the in-band data and a fourth port to receive the out-of-band data.

7. The system of claim 6, wherein the storage device comprises an Ethernet solid state drive (SSD) and the third port comprises an Ethernet port and the fourth port comprises an Inter-Integrated Circuit (I2C) or System Management Bus (SMBus) port.

8. The system of claim 1, wherein the management device or the management processor applies a header information to at least one packet of data associated with the in-band data.

9. The system of claim 8, wherein the header information comprises a Management Component Transport Protocol (MCTP) over Transmission Control Protocol (TCP) based information and the at least one packet is transmitted to the management processor via a TCP Internet Protocol (IP) over Ethernet protocol.

10. The system of claim 1, wherein the out-of-band data is received from a management host and the out-of-band data is transmitted to the storage device via an I2C/SMBus.

11. The system of claim 1, wherein the data update comprises a firmware upgrade or a security certificate.

12. A device for performing communication management, comprising:
    at least one memory device that stores computer-executable instructions; and at least one processor configured to access the at least one memory device, wherein the at least one processor is configured to execute the computer-executable instructions to:
receive, via a first port corresponding to a first path, in-band data from a management device, the in-band data comprising a management operation comprising a data update;
generate routing information for routing the in-band data comprising the management operation to one or more storage devices in a chassis;
apply the routing information to a header of a packet of data associated with the in-band data; and
transmit, via a second port corresponding to the first path, the in-band data to a storage device of the one or more storage devices based on the routing information,
wherein the first path comprises a higher bandwidth storage path than a second path corresponding to the storage device,
wherein the first path comprises the processor connected between the management device and the storage device,
wherein the first port and the second port connect to different layers of a protocol stack within the storage device, and
wherein:
the first port is connected to a first layer, a binding layer, and a platform level data model (PLDM) layer of the protocol stack within the storage device; and
the second port is connected to the binding layer and the PLDM layer within the storage device.

13. The device of claim 12, wherein the device comprises an Ethernet bunch of flash (EBOF) processor and the management device comprises at least one of a baseboard management controller (BMC), a field-programmable array (FPGA), an application specific integrated circuit (ASIC), or a processor.

14. The device of claim 12, wherein the header comprises a Management Component Transport Protocol (MCTP) over Transmission Control Protocol (TCP) based information and the packet is transmitted via a TCP Internet Protocol (IP) over Ethernet protocol.

15. The device of claim 12, wherein the device transmits, via the second port, the in-band data to a second storage device of the one or more storage devices via a switch.

16. The device of claim 12, wherein the data update comprises a firmware upgrade or a security certificate.

17. A method for performing communication management, comprising:
receiving in-band data from a management device via a first path, the in-band data comprising a management operation comprising a data update;
generating routing information for routing the in-band data comprising the management operation to one or more storage devices;
applying the routing information to a header of a packet of data associated with the in-band data; and
transmitting the in-band data to a storage device of the one or more storage devices via the first path based on the routing information,
wherein the first path comprises a higher bandwidth storage path than a second path corresponding to the storage device,
wherein the first path comprises a management processor connected between the management device and the storage device,
wherein the first path and the second path connect to different layers of a protocol stack within the storage device, and
wherein:
the first path is connected to a first layer, a binding layer, and a platform level data model (PLDM) layer of the protocol stack within the storage device; and
the second path is connected to the binding layer and the PLDM layer within the storage device.

18. The method of claim 17, wherein the header comprises a Management Component Transport Protocol (MCTP) over Transmission Control Protocol (TCP) based information and the packet is transmitted via a TCP Internet Protocol (IP) over Ethernet protocol.

19. The method of claim 17, further comprising transmitting the in-band data to a second storage device of the one or more storage devices via a switch.

20. The method of claim 17, wherein the data update comprises a firmware upgrade or a security certificate.

21. The system of claim 1, wherein the first path comprises a higher speed storage path.

22. The system of claim 1, wherein the protocol stack comprises a binding layer.

23. The system of claim 22, wherein the protocol stack further comprises a protocol block comprising a platform level data model (PLDM) protocol.

* * * * *